United States Patent [19]

Aida et al.

[11] Patent Number: 5,445,249
[45] Date of Patent: Aug. 29, 1995

[54] DYNAMIC VIBRATION ABSORBER

[75] Inventors: Yasuhiko Aida, Yokohama; Hiroshi Miyano, Kamakura; Kiyoshi Hattori, Yokohama; Yoshiyuki Sakurai, Yokohama; Eiji Manome, Yokohama; Toshiaki Nasuda, Yokohama, all of Japan

[73] Assignee: Kabushiki Kaisha Toshiba, Kawasaki, Japan

[21] Appl. No.: 198,269

[22] Filed: Feb. 18, 1994

[30] Foreign Application Priority Data

Feb. 18, 1993 [JP] Japan .................. 5-029199
Feb. 25, 1993 [JP] Japan .................. 5-035980

[51] Int. Cl.6 ......................................... F16F 7/12
[52] U.S. Cl. ......................... 188/378; 188/267; 335/285
[58] Field of Search .............. 188/378, 379, 380, 267; 335/285, 306; 310/51

[56] References Cited

U.S. PATENT DOCUMENTS

| | | | |
|---|---|---|---|
| 1,395,437 | 11/1921 | Liebau . | |
| 3,216,349 | 11/1965 | Kraft | 335/285 |
| 3,387,499 | 6/1968 | Bruderlein | 188/379 X |
| 3,423,614 | 1/1969 | Poteate et al. | 188/267 X |
| 3,477,050 | 11/1969 | Hinger | 335/285 |
| 4,101,009 | 7/1978 | Hehl et al. | 188/379 |
| 4,282,938 | 8/1981 | Minamidate | 173/162 H |
| 4,314,623 | 2/1982 | Karokawa | 188/379 X |
| 4,471,331 | 9/1984 | Wyatt | 335/285 |
| 4,935,651 | 6/1990 | Hong et al. | 310/51 |

FOREIGN PATENT DOCUMENTS

| | | |
|---|---|---|
| 6606380 | 3/1965 | Germany . |
| 2240761 | 3/1973 | Germany . |
| 4001981 | 7/1990 | Germany . |
| 744041 | 2/1956 | United Kingdom . |
| 2208419 | 3/1989 | United Kingdom . |
| WO/90/03524 | 4/1990 | WIPO . |

OTHER PUBLICATIONS

Patent Abstracts of Japan, vol. 13, No. 560, (N-906) (3908), Dec. 13, 1989, JP-A-1 234 636, Sep. 19, 1989.
Proceedings of 8th Japan Earthquake Engineering Symposium, Satoru Aizawa, et al., "Experimental Study of Dual Axis Active Mass Damper", pp. 1899-1904, 1990.

*Primary Examiner*—Robert J. Oberleitner
*Assistant Examiner*—Lee W. Young
*Attorney, Agent, or Firm*—Oblon, Spivak, McClelland, Maier & Neustadt

[57] ABSTRACT

A dynamic vibration absorber includes a movable weight portion, and a movable portion magnet assembly provided for the movable weight portion. The movable portion magnet assembly includes a magnet train having a plurality of cylindrical magnets disposed coaxially in such a manner that adjacent cylindrical magnets have different adjacent magnetic poles. A fixed portion is provided in opposed relation to the movable weight portion and a fixed portion magnet train is provided on the fixed portion and includes a plurality of magnets having magnetic poles different, in a stationary state, from opposed magnetic poles of the cylindrical magnets. The movable weight portion is preferrably disposed in a vessel. A magnetic damper is further provided, which has a plurality of conductor plates mounted on an outer peripheral surface of the movable weight portion, and a plurality of yokes are secured to an inner surface of the peripheral side portions of the cylindrical vessel at portions corresponding to the conductor plates. Each of the yokes have a pair of yoke portions facing each other, and a pair of magnets are provided on the facing surfaces of the paired yoke portions with a gap therebetween into which the corresponding conductor plates are inserted.

9 Claims, 7 Drawing Sheets

DYNAMIC VIBRATION ABSORBER

BACKGROUND OF THE INVENTION

The present invention relates to a dynamic vibration absorber capable of suppressing vibrations in horizontal two-dimensional directions of a target or object structure.

Generally, a dynamic vibration absorber includes an additional weight portion which is subjected to a force of inertia by vibrations, a rigidity element for generating a reaction force to the inertia force applied to the additional weight portion and a damping element for absorbing vibration energy.

A conventional dynamic vibration absorber is constructed such that vibrations in a specified direction of a target structure are suppressed by vibrating an additional weight portion. Hence, if there are a plurality of directions in which vibrations are to be controlled, the vibration controlling equipment must contain the same number of dynamic vibration absorbers as that of directions of vibrations.

One example of the conventional dynamic vibration absorber will be described with reference to FIGS. 10A and 10B.

In FIGS. 10A and 10B, a target structure 200 placed on a floor 201 has two vibration directions of the x- and y-axis. On the target structure 200 are placed two dynamic vibration absorbers 202a and 202b corresponding to the directions of vibrations. Each of the dynamic vibration absorbers 202a and 202b is locked to a locking structure 203a (203b). In each of the dynamic vibration absorbers, an additional weight portion 204a (204b) is supported by both a rigidity element 205a (205b) and a damping element 206a (206b).

In each of the dynamic vibration absorbers 202a and 202b, when vibrations are generated in the target structure 200, the damping elements 206a)and 206b) reduce vibration energy while the rigidity elements 205a and 205b apply reaction forces to the force of inertia generated in the additional weight portions 204a and 204b. Thus, the dynamic vibration absorbers 202a and 202b provide the damping effect for the vibrations in the x- and y-axis directions shown in FIG. 10B, respectively. In other words, in the conventional dynamic vibration absorbers, the single dynamic vibration absorber is provided to supress vibrations in one direction, that is, one for the horizontal (x-axis)direction and the other for the vertical (y-axis) direction as shown in FIG. 10B.

In the conventional dynamic vibration absorbers of the structures described above, there is no problem in a case where there is a large space for installation of the dynamic vibration absorbers and a plurality of dynamic vibration absorbers can be hence provided in a large target structure, such as a building. However, where there is a limitation to the installation space for dynamic vibration absorbers and where damping in a plurality of directions is required, as in a machinery, it is difficult to adequately install the vibration controlling devices having a conventional structure in which the directions of vibrations of the additional weight portions are determined.

SUMMARY OF THE INVENTION

In view of the aforementioned problems of the prior art, an object of the present invention is to substantially eliminate the problems and to provide a dynamic vibration absorber in which a single movable weight portion is supported in such a manner that it can cope with vibrations in any direction of horizontal two-dimensions in order to control the vibrations of a target structure in a plurality of directions while enabling easy installation.

This and other objects can be achieved according to the present invention by providing, in one aspect, a dynamic vibration absorber comprising:

a movable weight portion serving as a dynamic vibration absorber;

a movable portion magnet means provided for the movable weight portion, the movable portion magnet means comprising a magnet train including a plurality of cylindrical magnets disposed coaxially in such a manner that adjacent cylindrical magnets have different magnetic poles;

a fixed portion provided in opposed relation to the movable weight portion; and a fixed portion magnet train provided on the fixed portion and comprising a plurality of magnets having magnetic poles different, in a stationary state, from magnetic poles of the cylindrical magnets disposed to oppose respectively the corresponding magnets on the fixed portion with a predetermined gap therebetween, wherein the movable weight portion is horizontally supported by a magnetic force which acts between the movable weight portion and the fixed portion.

In preferred embodiments in this aspect, the movable weight portion has a cylindrical outer appearance and is disposed in a cylindrical vessel having top and bottom portions and a peripheral side portion disposed between the top and bottom portions and the fixed portion magnet train is disposed on each of the top and bottom portions of the cylindrical vessel.

As a magnetic damper means, a plurality of conductor plates are mounted on an outer peripheral surface of the movable weight portion and a plurality of yoke means are secured to an inner surface of the peripheral side portions of the cylindrical vessel at portions corresponding to the conductor plates, each of the yoke means having a pair of yoke portions facing each other, and a pair of magnets are provided on the facing surfaces of the paired yoke portions with a gap therebetween into which the corresponding conductor plates are inserted.

Each of the yoke means comprises a pair of a yoke portions and a yoke portion fixing member, the yoke portion fixing member having an inner surface against which one ends of the paired yoke portions abut slidably and the yoke portions having other one ends facing each other, and one ends of the yoke portions are secured to the yoke portion fixing member by means of screw to be adjustable.

In another aspect, there is provided a dynamic vibration absorber comprising:

a cylindrical vessel having top and bottom portions and a peripheral side portions disposed therebetween;

a movable weight portion disposed concentrically in the cylindrical vessel and serving as a dynamic vibration absorber; and a plurality of coil spring means disposed between a fixed portion of the cylindrical vessel and the movable weight portion so as to support the movable weight portion in a horizontal plane by an urging forces of the coil spring means.

In preferred embodiments of this aspect, the fixed portion of the cylindrical vessel is the top portion thereof to which a plurality of coil spring means mounting blocks are mounted and a central column member is disposed at a central portion of a top surface of the movable weight portion so as to extend towards the top portion of the cylindrical vessel, the coil spring means being secured at one ends to the mounting blocks and at other ends to the central column of the movable weight portion.

The movable weight portion has an inner hollow structure in which a fluid fills to be adjustable in amount. The inner hollow portion of the movable weight portion is divided into a plurality of blocks by a plurality of vertical partition plates to prevent the fluid from being vibrated entirely, the partition plates being provided with through holes respectively through which the fluid is accommodated in the respective blocks with equal level being maintained. The movable weight portion is provided with a fluid inlet at a top portion thereof and a fluid outlet at a bottom portion thereof.

The inner hollow portion may be divided into a plurality of horizontal sections by spacers each in shape of a disk, the spacers being provided with number of through holes through which fluid flows in the movable weight portion.

In a further aspect, there is provided a dynamic vibration absorber comprising:

a cylindrical vessel having top and bottom portions and a peripheral side portions disposed therebetween;

a fixed portion magnet means mounted to inner surfaces of the top and bottom portions of said cylindrical vessel constituted as a fixing portion;

a movable weight portion disposed concentrically in said cylindrical vessel and serving as a dynamic vibration absorber;

a movable portion magnet means provided on top and bottom portions of the movable weight portion and having same polarities as those of the corresponding fixed portion magnet means; and a plurality of plate spring means disposed between the side peripheral portion of the cylindrical vessel and an outer peripheral side portion of the movable weight portion so as to support the movable weight portion in a horizontal plane by an urging forces of the plate spring means.

The plate spring means are disposed with equal spaces with each other so as to provide a spiral fashion, and the plate spring means have one ends at which are secured rollers abutting against the inner peripheral surface of the cylindrical vessel.

The movable portion magnet means may be embedded in the top and bottom portions of the movable weight portion.

It is of course to be noted that the preferred embodiments of the respective aspects of the present invention may be combined with various modifications other than described above.

According to the structures and characteristics of the present invention described above, in one aspect, when the movable weight portion shifts from its stationary state, i.e., when the center of the movable portion magnetic train deviates from the center of the fixed magnetic train which opposes the movable portion magnet train, an attracting force acts between the different magnets which oppose each other when the movable weight portion is in a stationary state and returns the magnets to their original states. When the position of the magnet in the magnet train deviates, the magnet approaches the adjacent magnet having a magnetic pole different from that magnet, so that a repelling force is generated therebetween. These forces act as a restoring force which returns the the movable portion magnet train and the fixed portion magnet trains, which have been offset in the radial direction, to their original positions. Further, since the magnets are disposed coaxially, the same restoring force can be obtained relative to the displacement in any direction of horizontal two-dimensions.

The vibration energy transmitted to the target structure by a vibratory disturbance, such as an earthquake, is effectively absorbed by the vibrations of the movable weight portion, and the resonance of the target structure can thus be eliminated. Further, vibrations in any direction of horizontal two-dimensions can be attenuated.

The rigidity with which the movable weight portion serving as the dynamic vibration absorber is supported horizontally can be readily adjusted to the optimum value by changing the amount of fluid or the number of partitions or porous disks. The dynamic vibration absorber which which performs excellently can thus be provided.

In another aspect, when the movable weight portion is subjected to the force of inertia from the target structure and moved from a stationary position, reaction corresponding to a displacement of the movable weight portion is generated in the spring elements disposed uniformly around the movable weight portion. Since the spring elements are disposed uniformly around the movable weight portion, they have the same rigidity in any direction of horizontal two-dimensions when it generates the reaction. At the same time, the conductor plate motions relative to the magnetic field in the yoke in which the magnets are disposed on the opposed end surfaces thereof. Therefore, an eddy current is generated in the conductor plate, and the motion of the conductor plate is restricted and damped due to the interaction between the eddy current and the magnetic field in the yoke. Consequently, vibration energy is absorbed and damping is thus performed.

In a further aspect, the movable weight portion is subjected to the force of inertia from the target structure and moved from a stationary position, and the plurality of plate springs uniformly are disposed on the periphery of the movable weight portion in a spiral fashion and connected to the inner side surface of the vessel through the rollers. The plurality of plate springs have a fixed rigidity in any direction of horizontal two-dimensions when they generate a reaction. Further, the weight of the movable weight portion is supported by the magnetic repelling force which acts between the movable portion magnets disposed on the upper and lower surfaces of the movable weight portion and the fixed portion magnets disposed to the upper and lower inner surfaces of the vessel.

The natures and further features of the present invention will be made more clear from the following preferred embodiments made with reference to the accompanying drawings.

DESCRIPTION OF THE PREFERRED EMBODIMENTS

Embodiments of the present invention will be described hereunder with reference to the accompanying drawings.

Figure 1:
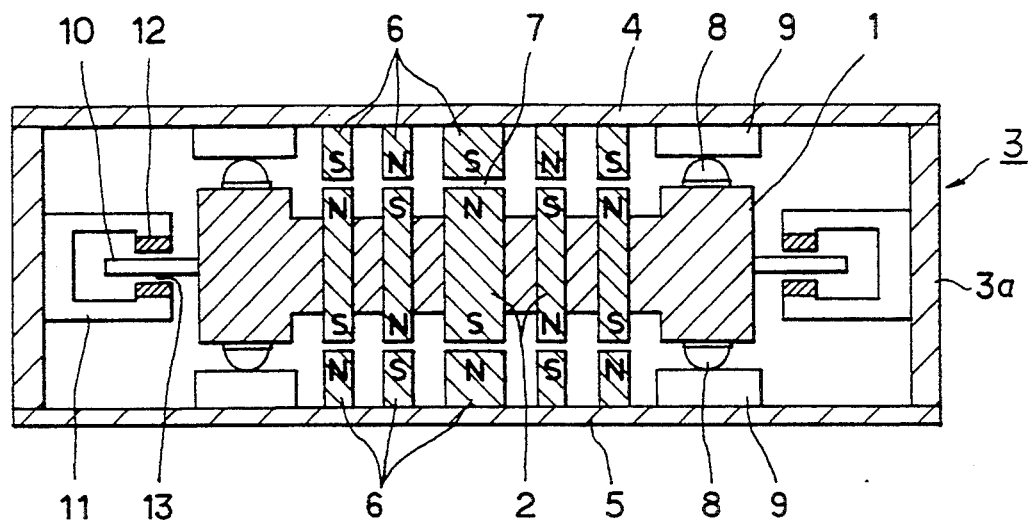
FIG. 1 is a vertical sectional view showing a first embodiment of a dynamic vibration absorber according to the present invention.
Figure 2:
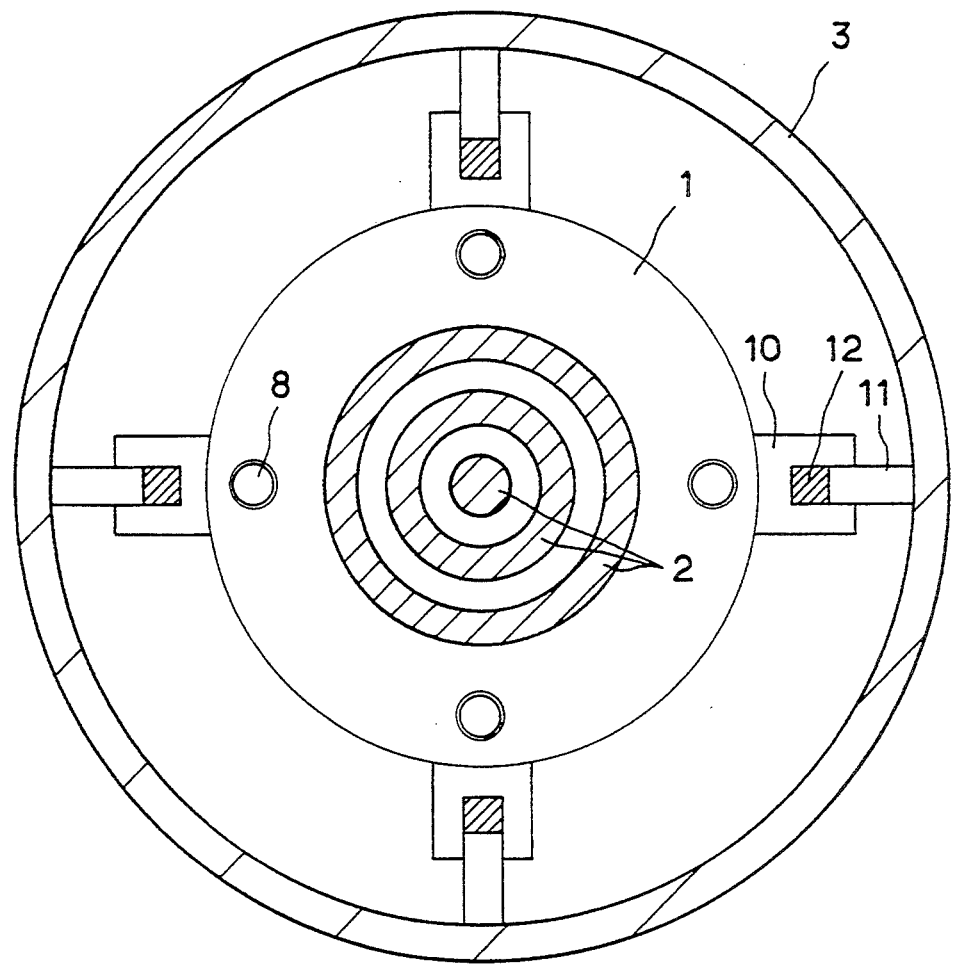
FIG. 2 is a horizontal sectional view of the dynamic vibration absorber of FIG. 1.

FIG. 1 is a vertical sectional view showing a first embodiment of a dynamic vibration absorber according to the present invention. FIG. 2 is a horizontal sectional view of FIG. 1.

Referring to FIGS. 1 and 2, a movable weight portion 1, serving as a vibration absorber, is provided with a movable portion magnet train 2 consisting of cylindrical magnets. The cylindrical magnets are disposed coaxially in the form of multiple cylinders in such a manner that the adjacent magnets have different magnetic poles. The movable weight portion 1 and the movable portion magnet train 2 are disposed in a cylindrical vessel 3 having upper and bottom plates 4 and 5, on a stationary side, opposing the movable portion magnet train 2, constituting a fixed portion.

In the space formed by the upper and bottom plates 4 and 5 of the cylindrical vessel 3 are accommodated respective elements of the dynamic vibration reducer, a fixed portion magnet train 6 mounted on the inner surface of the upper plate 4 and a fixed portion magnet train 6 mounted on the inner surface of the bottom plate 5. Each of the fixed portion magnet trains 6 has the same shape as corresponding one of the movable portion magnet train 2 and is separated from the movable portion magnet train 2 in the vertical direction through a predetermined gap 7. In each of the fixed portion magnet trains 6, magnetic poles are disposed such that they respectively oppose the cylindrical magnets having magnetic poles different from the magnetic poles in the movable weight portion 1 in a stationary state.

Four bearings (spherical bearings) are fixed equiangularly on each of the upper and bottom surfaces of the movable weight portion 1 on a horizontal plane and receptacles 9 are fixed on each of the upper and bottom plates 4 and 5 which oppose the bearings 8. The contact of each of the bearings 8 with the corresponding receptacle 9 makes the vertical position of the movable weight portion 1 restricted, to thereby maintain the gap 7 to a fixed value. In this embodiment, it is thus possible to adjust the rigidity, with which the movable weight portion 1 is supported in the horizontal direction, by adjusting the magnetomotive forces generated by the magnets in the movable portion magnet train 2 and fixed portion magnet trains 6 and also adjusting the gap 7.

Further, in order to optimize the damping force which acts on the movable weight portion 1, a magnetic damper means is constituted in this embodiment by providing four conductor plates 10 and four yoke means 11. Each of the yoke means 11 is composed of a base portion to be secured to the side wall surface of the vessel 3 and yoke portions extending from the base portion parallelly so as to provide substantially -shape. The conductor plates 10 are mounted on the peripheral surface of the movable weight portion 1 equiangularly on a horizontal plane in such a manner that each of the conductor plates 10 is sandwiched between two magnets 12 disposed at distal ends of the yoke portions of a yoke means 11 fixed to the side peripheral surface of the cylindrical vessel 3 with gap 13 therebetween.

It is therefore possible to adjust the damping force which acts on the movable weight portion 1 by adjusting the magnetomotive forces generated by the magnets 12, the gap 13 and the number of magnetic dampers provided.

The excellent performance of the dynamic vibration reducers, i.e., a restoring force which returns the movable weight portion 1 to a stationary position, can be obtained by adjusting the distances between the multiple cylinders according to the displacement required for the movable weight portion 1. That is, the distances of the cylindrical magnets can be adjusted such that, for example, the central N pole of the movable portion magnet train 2 is not attracted by the S pole located beyond the N pole in the fixed portion magnet train 6 located adjacent to the central N pole.

The function of this embodiment will now be described.

When the movable weight portion 1 shifts from its stationary state, i.e., when the center of the movable portion magnetic train 2 deviates from the center of the fixed magnetic train 6 which opposes the movable portion magnet train 2, an attracting force acts between the different magnets which oppose each other when the movable weight portion 1 is in a stationary state and returns the magnets to their original states. Furthermore, when the position of the magnet in the magnet train deviates, the magnet approaches the adjacent magnet having a magnetic pole different from that magnet, so that a repelling force is generated therebetween. These forces act as a restoring force which returns the movable portion magnet train 2 and the fixed portion magnet trains 6 which have been offset in the radial direction to their original positions. Further, since the magnets are disposed coaxially, the same restoring force can be obtained relative to the displacement in any direction of horizontal two-dimensions.

In a modification of the first embodiment, the fixed portion magnet train 6 is composed of permanent magnets and electromagnets. In this way, the magnetomotive force generated by the fixed portion magnet train 6 can be made variable, and the support rigidity of the movable weight portion 1 in the horizontal direction can thus be readily adjusted.

In this embodiment, since the movable weight portion 1 is horizontally supported in a completely non-contact state except for a portion thereof in which the vertical position is restricted by the bearings 8 and the receptacles 9, a contact friction caused by vibrations or a fatigue of the support member can be eliminated. As a result, a highly reliable vibration absorber can be provided.

Figure 3:
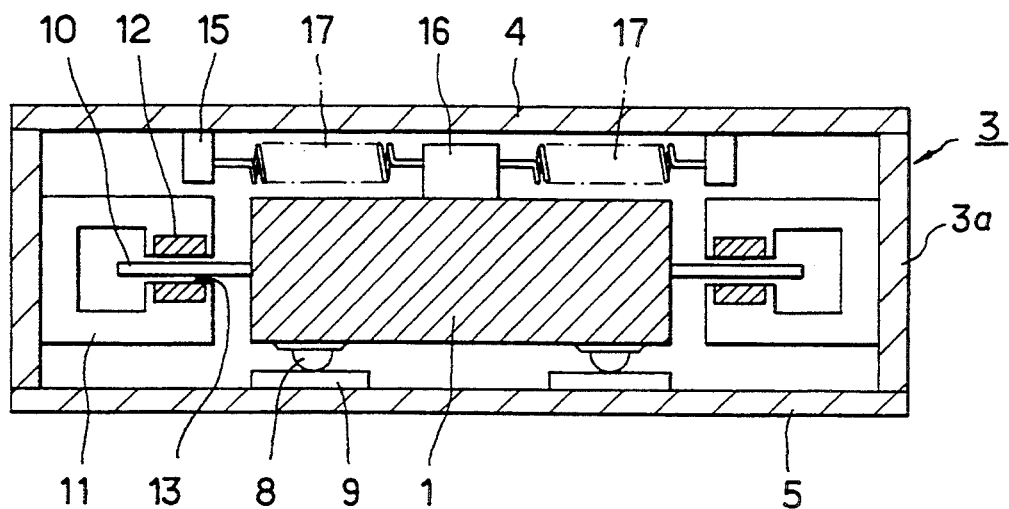
FIG. 3 is view similar to that of FIG. 1, but related to a second embodiment of a dynamic vibration absorber according to the present invention.
Figure 4:
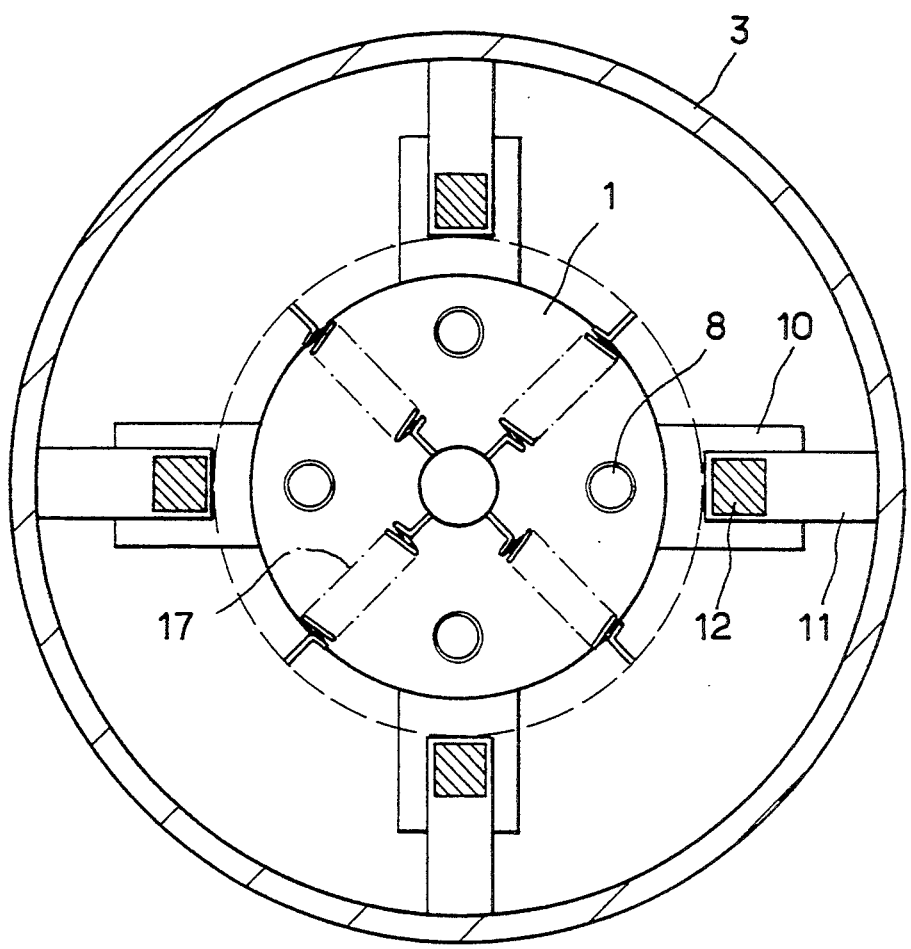
FIG. 4 is a horizontal sectional view of the dynamic vibration absorber of FIG. 3.

FIG. 3 is a vertical sectional view showing a second embodiment of the dynamic vibration absorber according to the present invention. FIG. 4 is a horizontal sectional view of FIG. 3. Like reference numerals are added to elements or members corresponding to those shown in FIGS. 1 and 2.

In FIG. 3, the movable weight portion 1, serving as a vibration absorber, is provided at the central portion of the cylindrical vessel 3. A coil spring mounting block or blocks 15 is fixed to the upper plate 4 on a fixed side of the vessel 3. A plurality of coil springs 17 are provided between the coil spring mounting block 15 and a coil spring mounting portion 16 (on a movable side) provided on the upper surface of the movable weight portion 1.

The four bearings 8 (spherical bearings) are fixed on the bottom surface of the movable weight portion 1 equiangularly, and the plurality of receptacles 9 are provided on the bottom plate 5 of the cylindrical vessel 3. Thus, the movable weight portion 1 is horizontally supported by the spring force of the coil springs 17 and the bearings 8 and, hence, can follow vibrations in any direction of horizontal two-dimensions.

Further, in order to optimize the damping force which acts on the movable weight portion 1, magnetic dampers are constituted in this embodiment by providing the four conductor plates 10 on the peripheral surface of the movable weight portion 1 equiangularly on a horizontal plane in such a manner that each of the conductor plates 10 is sandwiched between the two magnets 12 disposed at the distal end of the yoke portions of the yoke means 11 fixed to the cylindrical vessel 3 with the gap 13 therebetween, as made in the first embodiment.

It is therefore possible to adjust the damping force which acts on the movable weight portion 1 by adjusting the magnetomotive forces generated by the magnets 12, the gap 13 and the number of magnetic dampers provided.

In the above second embodiment, the yoke means 11 is of the structure fixed to the peripheral surface 3a of the cylindrical vessel 3, but in an alternation, the yoke means may be secured movably.

Figure 5:
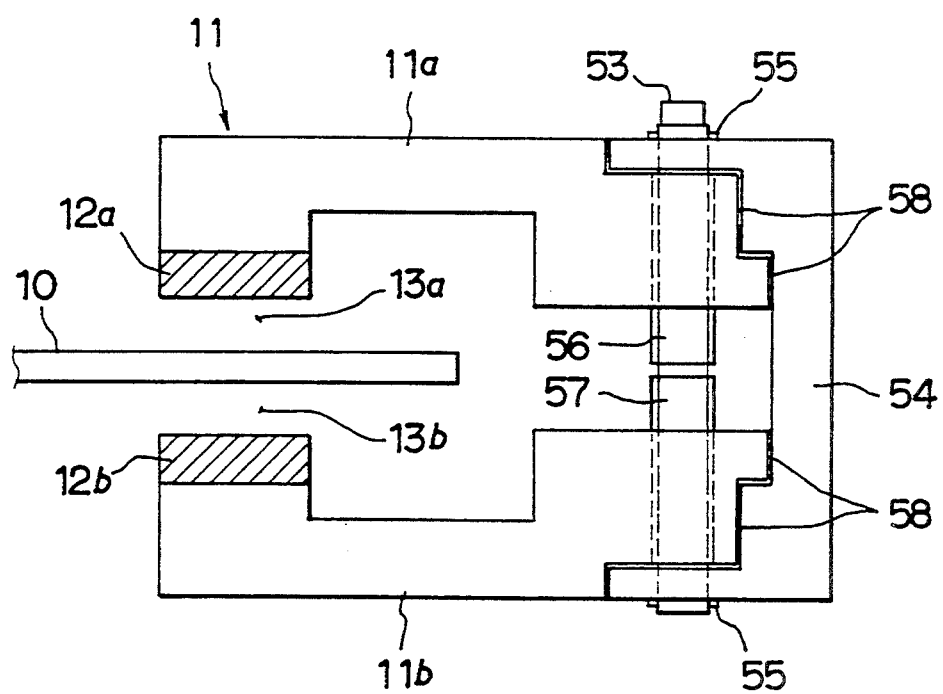
FIG. 5 is an enlarged view of a yoke portion shown in FIG. 1 or 3 in a modified example.

That is, FIG. 5 is an enlarged view of the yoke means 11 shown in FIGS. 1 and 3. In FIG. 5, the yoke 11 (yoke portions 11a, 11b) with the magnets 12 (12a, 12b) provided on the opposing upper and lower surfaces of the distal end thereof is coupled to a fixed block 54 through a guide bar 53. The vertical movement of the guide bar 53 relative to the fixed block 54 is restricted by locking washers 55. An upper portion of the guide bar 53 is right-handedly threaded to form a right-handed screw 56, and a lower portion thereof is left-handedly threaded to form a left-handed screw 57. The right-handed screw 56 is in thread engagement with an upper yoke portion 11a, and the left-handed screw 57 is in threaded engagement with a lower yoke portion 11b. The guide bar 53 is not in threaded engagement with the fixed block 54. Consequently, the rotation of one end of the guide bar 53 enables the upper and lower yoke portions 11a and 11b to be rotated in opposite directions at the same time through the same distance, i.e., it allows the gaps 13a and 13b between the conductor plate 10 and the upper and lower magnets 12a and 12b to be adjusted at the same time by the same amount. The yoke portions 11a and 11b are in contact with the fixed block 54 through a sliding surface 58 to ensure a magnetic path cross-sectional area as a magnetic circuit.

Figure 6A:
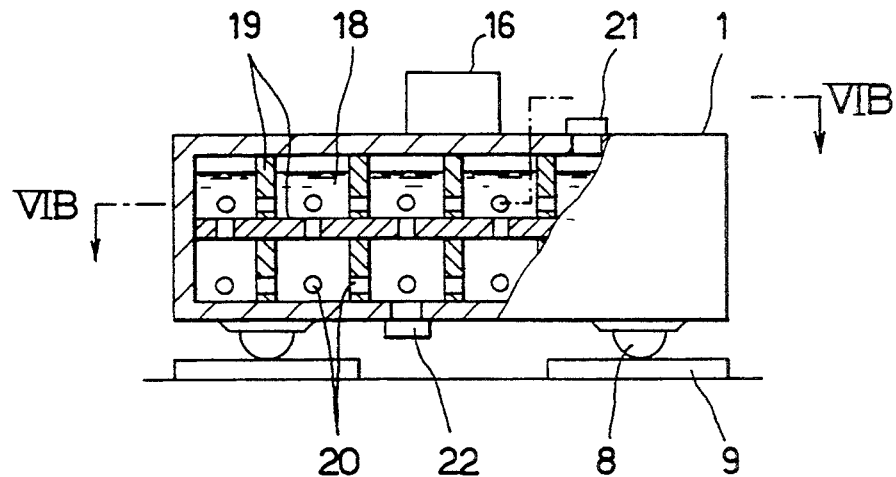
FIG. 6A is a partially vertical sectional view showing an internal structure of a movable weight portion VIB—VIB of FIG. 6A.
Figure 6B:
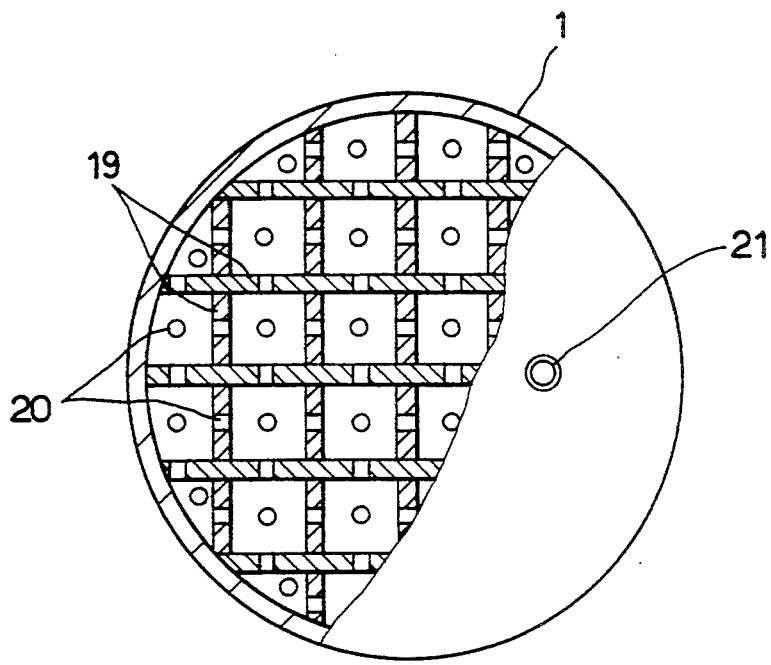

FIGS. 6A and 6B show an internal structure of the movable weight portion 1 of the second embodiment in which a fluid 18 is filled up and the rigidity, with which the movable weight portion 1 is supported in the horizontal direction, can be readily adjusted by changing the amount of the fluid 18 in order to enhance the performance of the dynamic vibration absorbers.

More specifically, the movable weight portion 1 has an inner hollow structure which is divided into a plurality of blocks by arranging partition plates 19 in order to prevent splash of the fluid, and the fluid 18 is uniformly accommodated in the interior of the movable weight portion 1 through holes 20 formed in the partition plates 19. The fluid 18 is supplied into and discharged from the movable weight portion 1 from a fluid supply port 21 provided in the upper surface thereof and a fluid discharge port 22 provided in the lower surface thereof, respectively.

The function of the second embodiment will now be described.

The dynamic vibration absorber of this embodiment is installed on a target structure. The vibration energy transmitted to the structure by a vibratory disturbance, such as an earthquake, is effectively absorbed by the vibrations of the movable weight portion 1 or the damping forces obtained by the magnetic dampers, and the resonance of the target structure can thus be eliminated. Further, damping in any direction of horizontal two-dimensions can be performed according to this embodiment.

According to this embodiment, the rigidity, with which the movable weight portion 1 is supported in the horizontal direction, can be readily adjusted by changing the amount of fluid 18, whereby the performance of the dynamic vibration reducers can be enhanced.

Furthermore, according to this embodiment, a greater damping effect can be obtained if the rigidity, with which the movable weight vibrating system is supported in the horizontal direction, is adjusted by changing the amount of the fluid 18 and if the frequency characteristic to the movable weight portion 1 is set to a value close to or approximately identical to that of the target structure.

Figure 7A:
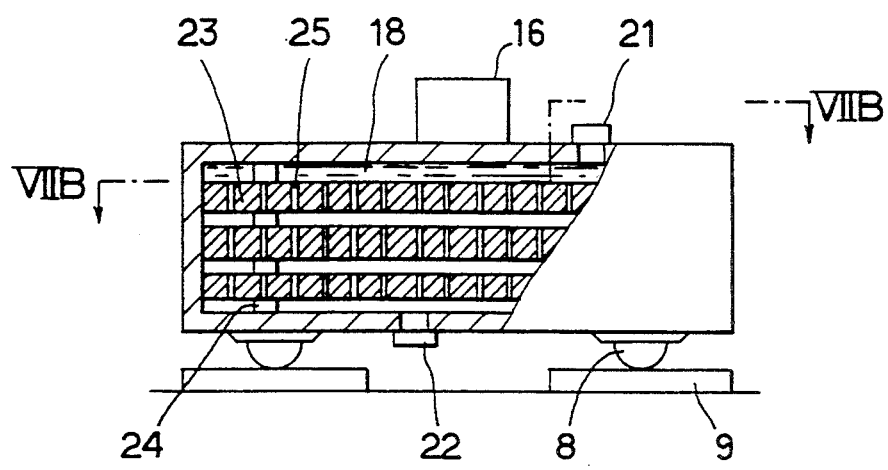
FIG. 7A is a partially vertical sectional view showing a modification of the internal structure of the movable weight portion and FIG. 7B is a section taken along the line VIIB—VIIB of FIG. 7A.
Figure 7B:
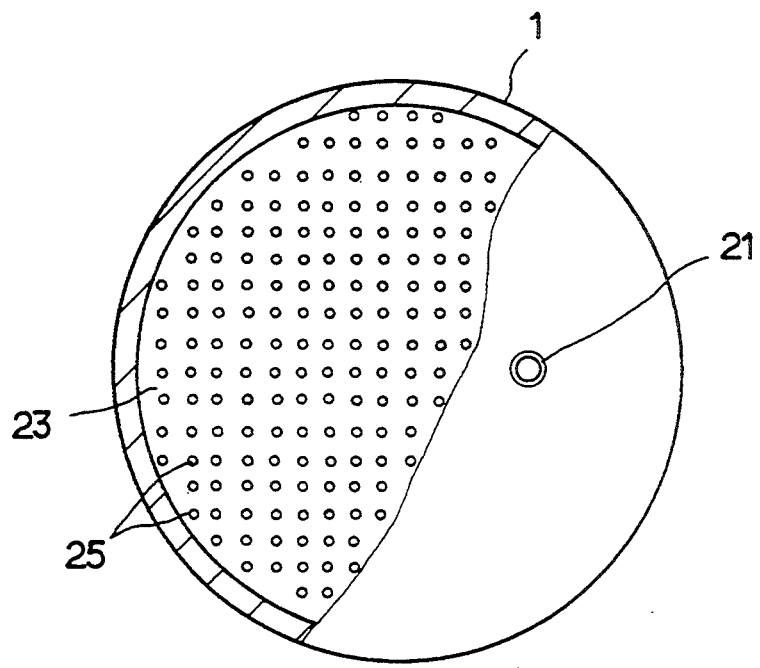

FIGS. 7A and 7B show the internal structure of the movable weight portion 1. In the movable weight portion 1, a plurality of porous disks 23 are disposed in such a manner that they are separated from each other in a vertical direction, in an installed state, through a spacer 24. The fluid 18 flows through a large number of pores 25 formed in the respective porous disks 23 so that the fluid 18 can be accommodated uniformly between the porous disks 23. The amount of the fluid 18 can be adjusted by supplying the fluid 18 from the fluid supply port 21 and by discharging the fluid 18 from the fluid discharge port 22.

Thus, it is possible in this modification to readily adjust the rigidity, with which the movable weight portion 1 is supported in the horizontal direction, by changing the number of porous disks 23 or the amount of fluid 18. As a result, the performance of the dynamic vibration reducer can be enhanced. The other structure and function are the substantially the same as those of the former embodiment, and description thereof is thus omitted.

A third embodiment of the present invention will be described below with reference to FIGS. 8 and 9.

Figure 8:
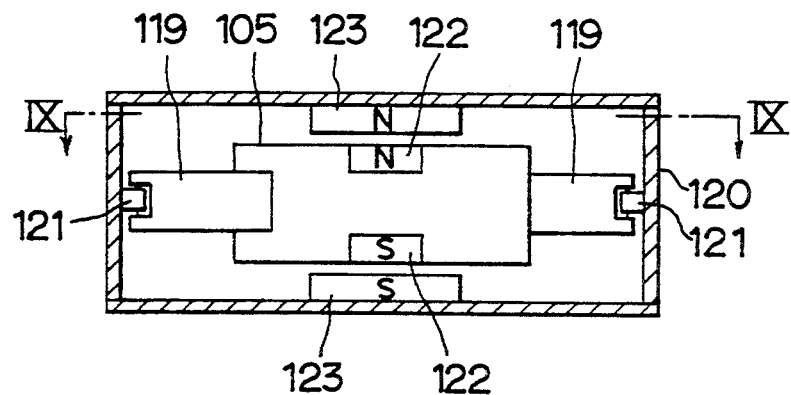
FIG. 8 is a vertical sectional view of a third embodiment of a dynamic vibration absorber according to the present invention.
Figure 9:
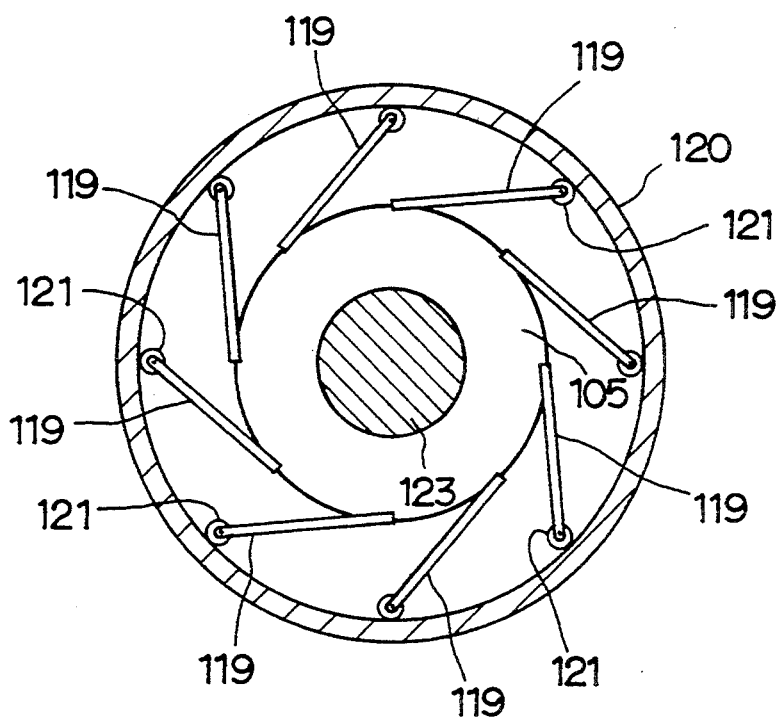
FIG. 9 is a view as seen when looking in the direction of the line IX—IX of FIG. 8.
Figure 10A:
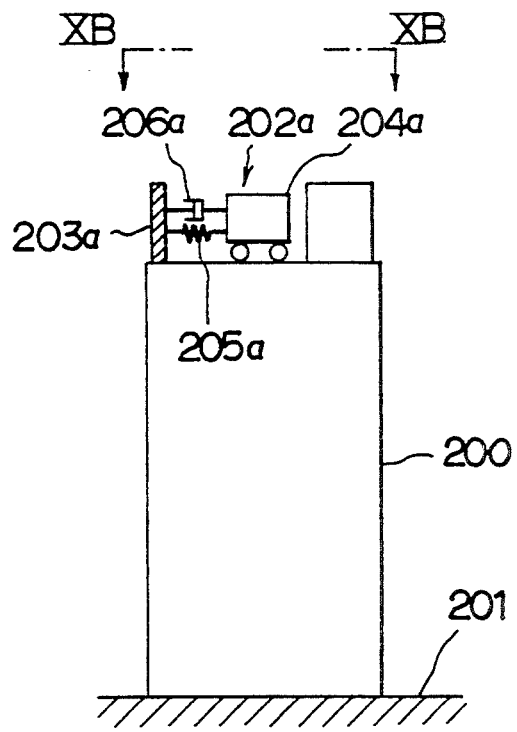
FIG. 10A shows a conventional example of the dynamic vibration absorber.
Figure 10B:
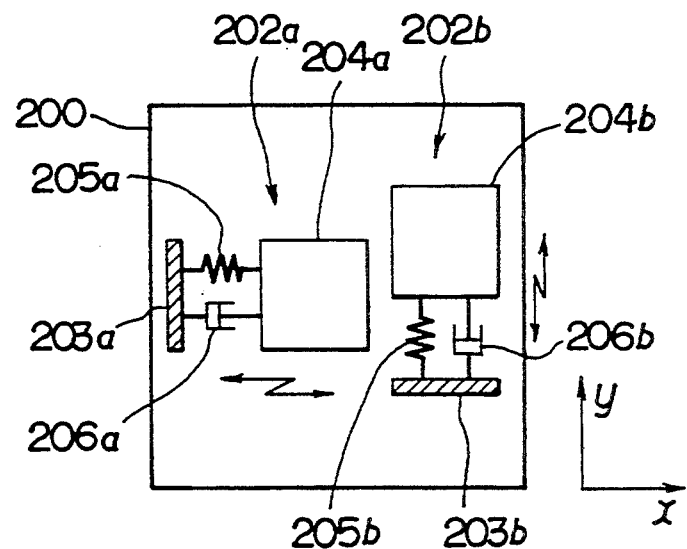
FIG. 10B is a view as seen when looking in the direction of the line XB—XB of FIG. 10A.

In FIGS. 8 and 9, a plurality of plate springs 119 are uniformly disposed in a spiral fashion on the periphery of the movable weight portion 105. The plate spring 119 are in contact, through rollers 121, with the inner side surface of a cylindrical vessel 120 in which the movable weight portion 105 is accommodated. A movable portion magnet 122 is embedded in each of the upper and lower surfaces of the movable weight portion 105, and a fixed portion magnet 123 is disposed in each of the upper and lower inner surfaces of the vessel 20, in an installed state, in such a manner that it opposes the corresponding movable portion magnet 122. The fixed portion magnet 123 and the movable portion magnet 122 which opposes that fixed portion magnet 123 have the same magnetic pole.

In the thus-arranged dynamic vibration absorber, by flexibly bending the plurality of plate springs 119 uniformly disposed on the periphery of the movable weight portion 105 in a spiral fashion, the resultant motion thereof relative to the vessel 120 offer a fixed rigidity in any direction of horizontal two- dimensions. Further, the movable weight portion 105 is supported in a non-contact state by the magnetic repelling force which acts between the movable portion magnets 122 and the fixed portion magnets 123 which oppose the movable portion magnets 22.

In the foregoing, three preferred embodiments and their modifications or alternations are described, but it is to be noted that various combinations of these modifications or alternations may be within the scopes of the appended claims.

According to the preferred embodiments of the present invention, the following effects or advantages can be attained.

As will be understood from the foregoing description, the dynamic vibration absorber of the present invention includes a movable weight portion serving as a dynamic vibration absorber, a movable portion magnet train provided in the movable weight portion in which cylindrical magnets are disposed coaxially in such a manner that adjacent cylindrical magnets have different magnetic poles, fixed portions provided in opposed relation to the movable portion magnet train, and a fixed portion magnet train provided on each of the fixed portions in which magnetic poles are disposed such that they respectively oppose the cylindrical magnets in the movable weight portion having magnetic poles different from the magnetic poles in a stationary state. Since the movable weight portion is horizontally supported by a magnetic force which acts between the movable weight portion and the fixed portion, it is supported in any direction of horizontal two-dimensions with the same rigidity. Consequently, the damping effect can be obtained regardless of the direction of vibrations using the single movable weight.

Furthermore, the present invention includes a movable weight portion provided in a cylindrical vessel to serve as a dynamic vibration absorber, and a plurality of coil springs provided between the movable weight portion and a fixed side of the cylindrical vessel to connect the movable weight portion to the fixed side. In this vibration absorber, since the movable weight portion is horizontally supported by the urging force of the coil springs, the vibration energy transmitted to the structure due to vibratory disturbance, such as an earthquake, is effectively absorbed by the vibrations of the movable weight portion, and resonance of the structure can thus be avoided. Further, vibrations in any direction of horizontal two-dimensions can be damped.

Still furthermore, in the dynamic vibration absorber of the present invention, the rigidity with which the movable weight portion serving as the dynamic vibration reducer can readily be adjusted to an optimum value by changing the amount of fluid accommodated in the movable weight portion or the number of porous disks disposed inside the movable weight portion. Consequently, the dynamic vibration absorber operated with high performance can be provided.

Still furthermore, in the dynamic vibration absorber according to the present invention, the movable weight portion is supported at the same rigidity in any direction of horizontal two-dimensions, and the damping effect can thus be obtained regardless of the direction of vibrations. Further, when the damping element is composed of the conductor plate and the yoke, the motion of the movable weight portion is restricted and damped in a non-contact state thereof to absorb vibration energy. Thus, a highly reliable damping effect can be obtained.

What is claimed is:

1. A dynamic absorber comprising:
   a movable weight portion serving as a dynamic vibration absorber;
   a movable portion magnet means provided for the movable weight portion, said movable portion magnet means comprising a magnet train including a plurality of cylindrical magnets disposed coaxially in such a manner that adjacent poles of adjacent magnets are different;
   a fixed portion provided in opposed relation to the movable weight portion; and
   a fixed portion magnet train provided on the fixed portion and comprising a plurality of magnets disposed to respectively oppose corresponding cylindrical magnets of the movable portion magnet means with a predetermined gap therebetween, the plurality of magnets of the fixed portion magnet train having magnetic poles different, in a stationary state, from magnetic poles of respective opposing cylindrical magnets of the movable portion magnet means;
   wherein said movable weight portion is horizontally supported by a magnetic force which acts between the movable weight portion and the fixed portion.

2. A dynamic vibration absorber according to claim 1, wherein said movable weight portion has a cylindrical outer appearance and is disposed in a cylindrical vessel having top and bottom portions and a peripheral side portion disposed between the top and bottom portions and said fixed portion magnet train is disposed on each of the top and bottom portions of the cylindrical vessel.

3. A dynamic vibration absorber according to claim 2, wherein a plurality of bearings are disposed on top and bottom surfaces of the movable weight portion and a plurality of bearing receptacles are disposed on inner surfaces of the top and bottom portions of the cylindrical vessel so as to receive corresponding bearings to thereby maintain the gap between the movable portion magnet train and the fixed portion magnet train.

4. A dynamic- vibration absorber according to claim 3, wherein the bearings and bearing receptacles are disposed and separated with equal angles, respectively, in a horizontal plane.

5. A dynamic vibration absorber according to claim 2, further comprising a magnetic damper means having a plurality of conductor plates mounted on an outer peripheral surface of the movable weight portion and a plurality of yoke means secured to an inner surface of the peripheral side portions of the cylindrical vessel at portions corresponding to the conductor plates, each of said yoke means having a pair of yoke portions facing each other, and a pair of magnets are provided on the facing surfaces of the paired yoke portions with gap into which the corresponding conductor plates are inserted with gap.

6. A dynamic vibration absorber according to claim 5, wherein the conductor plates and the yoke means are provided with equally spaced angles, respectively, in a horizontal plane.

7. A dynamic vibration absorber according to claim 6, wherein the numbers of the conductor plates and the yoke means are adjustable.

8. A dynamic vibration absorber according to claim 5, wherein each of said yoke means comprises a pair of a yoke portions and a yoke portion fixing member, said yoke portion fixing member having an inner surface to which one ends of the paired yoke portions contact slidably and said yoke portions having other one ends facing each other.

9. A dynamic vibration absorber according to claim 8, wherein the one ends of the yoke portions are secured to the yoke portion fixing member by means of screw to be adjustable.

* * * * *